United States Patent
Katoh et al.

(10) Patent No.: US 10,449,629 B2
(45) Date of Patent: Oct. 22, 2019

(54) METHOD FOR BONDING STAINLESS STEEL MEMBERS AND STAINLESS STEEL

(71) Applicants: NATIONAL INSTITUTE OF ADVANCED INDUSTRIAL SCIENCE AND TECHNOLOGY, Chiyoda-ku (JP); KOMATSUSEIKI KOSAKUSHO CO., LTD., Suwa-shi (JP)

(72) Inventors: Masahito Katoh, Tsukuba (JP); Tomomi Shiratori, Suwa (JP)

(73) Assignees: NATIONAL INSTITUTE OF ADVANCED INDUSTRIAL SCIENCE AND TECHNOLOGY, Chiyoda-ku (JP); KOMATSUSEIKI KOSAKUSHO CO., LTD., Suwa-shi (JP)

( * ) Notice: Subject to any disclaimer, the term of this patent is extended or adjusted under 35 U.S.C. 154(b) by 22 days.

(21) Appl. No.: 15/359,216

(22) Filed: Nov. 22, 2016

(65) Prior Publication Data

US 2017/0072503 A1    Mar. 16, 2017

Related U.S. Application Data

(60) Division of application No. 14/881,971, filed on Oct. 13, 2015, which is a continuation of application No. PCT/JP2014/074972, filed on Sep. 19, 2014.

(30) Foreign Application Priority Data

Sep. 27, 2013   (JP) .................................. 2013-201834

(51) Int. Cl.
*B23K 20/00*   (2006.01)
*B23K 20/227*   (2006.01)
(Continued)

(52) U.S. Cl.
CPC .......... *B23K 20/227* (2013.01); *B23K 20/021* (2013.01); *B23K 20/023* (2013.01);
(Continued)

(58) Field of Classification Search
CPC ................ B23K 20/227; B23K 20/023; B23K 2203/05; B23K 20/021; B23K 2103/05;
(Continued)

(56) References Cited

U.S. PATENT DOCUMENTS 3,019,513 A     2/1962   Hornaday
3,385,740 A *   5/1968   Baggstrom ............. C22C 38/44
                                                    148/325

(Continued)

FOREIGN PATENT DOCUMENTS

DE   30 04 758 A1   8/1980
GB   1 365 403 A    9/1974
(Continued)

OTHER PUBLICATIONS

International Search Report dated Nov. 11, 2014 in PCT/JP2014/074972 filed Sep. 19, 2014 (with English translation).

(Continued)

*Primary Examiner* — Kiley S Stoner
(74) *Attorney, Agent, or Firm* — Oblon, McClelland, Maier & Neustadt, L.L.P.

(57) ABSTRACT

A method for bonding stainless steel members includes: contacting a first stainless steel member with a second stainless steel member that has a strain exceeding 50% reduction; and heating the first and second stainless steel members to a re-crystallization initiation temperature or higher, after the contacting.

4 Claims, 8 Drawing Sheets

(51) Int. Cl.

| | |
|---|---|
| *B23K 20/02* | (2006.01) |
| *C22C 38/00* | (2006.01) |
| *C22C 38/02* | (2006.01) |
| *C22C 38/04* | (2006.01) |
| *C22C 38/44* | (2006.01) |
| *C22C 38/54* | (2006.01) |
| *C22C 38/58* | (2006.01) |
| *C21D 6/00* | (2006.01) |
| *B23K 103/04* | (2006.01) |

(52) U.S. Cl.
CPC ............ *C21D 6/002* (2013.01); *C22C 38/001* (2013.01); *C22C 38/002* (2013.01); *C22C 38/02* (2013.01); *C22C 38/04* (2013.01); *C22C 38/44* (2013.01); *C22C 38/54* (2013.01); *C22C 38/58* (2013.01); *B23K 2103/05* (2018.08); *C21D 2211/001* (2013.01); *C21D 2211/008* (2013.01)

(58) Field of Classification Search
CPC .............. C21D 6/002; C21D 2211/008; C21D 2211/001; C22C 38/02; C22C 38/001; C22C 38/58; C22C 38/04; C22C 38/44; C22C 38/54; C22C 38/002
USPC .... 228/193–195, 233.1–234.1, 235.1–235.3, 228/262.41–262.42
See application file for complete search history.

(56) References Cited

U.S. PATENT DOCUMENTS

| | | | | |
|---|---|---|---|---|
| 3,457,960 | A | * | 7/1969 | Yoshimitsu ............... F16L 9/02 138/143 |
| 3,650,844 | A | | 3/1972 | Kendall, Jr. et al. |
| 3,879,838 | A | | 4/1975 | Miller |
| 4,194,672 | A | | 3/1980 | Uto |
| 4,363,952 | A | | 12/1982 | Onishi et al. |
| 4,455,352 | A | | 6/1984 | Ayres |
| 4,564,402 | A | * | 1/1986 | Morishige .............. B01J 19/002 148/529 |
| 4,624,406 | A | * | 11/1986 | Yasuda .................... B23K 9/04 219/76.12 |
| 4,763,828 | A | | 8/1988 | Fukaya |
| 4,846,904 | A | | 7/1989 | Arai et al. |
| 5,170,932 | A | | 12/1992 | Blumauer |
| 5,183,198 | A | | 2/1993 | Tamehiro et al. |
| 6,156,134 | A | * | 12/2000 | Shimizu ................ B23K 20/023 148/526 |
| 6,398,504 | B1 | | 6/2002 | Arai et al. |
| 6,478,214 | B1 | | 11/2002 | Rigal |
| 6,761,857 | B1 | | 7/2004 | Takahashi et al. |
| 9,726,305 | B2 | * | 8/2017 | Shinohara ................. F16L 9/02 |
| 2001/0030004 | A1 | * | 10/2001 | Kushida ............... B23K 9/0253 148/325 |
| 2003/0047587 | A1 | | 3/2003 | Aono et al. |
| 2003/0145916 | A1 | * | 8/2003 | Kamada ................. C21D 6/004 148/542 |
| 2004/0031544 | A1 | * | 2/2004 | Hara ...................... C21D 8/0226 148/521 |
| 2004/0060623 | A1 | * | 4/2004 | Boke ........................ C21D 1/19 148/641 |
| 2004/0226634 | A1 | * | 11/2004 | Hirasawa ............... C21D 6/002 148/609 |
| 2005/0273994 | A1 | | 12/2005 | Bergstrom |
| 2006/0130937 | A1 | * | 6/2006 | Ikeda ........................ C21D 8/02 148/320 |
| 2007/0071997 | A1 | * | 3/2007 | Goto ........................ C22C 38/02 428/659 |
| 2008/0107559 | A1 | | 5/2008 | Nishiyama |
| 2008/0296354 | A1 | | 12/2008 | Crockett |
| 2009/0159602 | A1 | * | 6/2009 | Hatano ................. C22C 38/001 220/581 |
| 2009/0166259 | A1 | | 7/2009 | Bradley et al. |
| 2009/0233141 | A1 | | 9/2009 | Kushibiki et al. |
| 2010/0136369 | A1 | * | 6/2010 | Ayer .................. B23K 20/1225 428/683 |
| 2010/0159265 | A1 | | 6/2010 | Fairchild et al. |
| 2010/0236668 | A1 | * | 9/2010 | Hara ...................... B23K 35/30 148/521 |
| 2010/0297463 | A1 | | 11/2010 | Hoffstaedter |
| 2012/0018028 | A1 | * | 1/2012 | Shimamura ............. B21C 37/08 138/142 |
| 2012/0214017 | A1 | * | 8/2012 | Murphy ................... B23K 9/048 428/592 |
| 2012/0267009 | A1 | * | 10/2012 | Obayashi .................. C23C 8/02 148/211 |
| 2013/0014567 | A1 | | 1/2013 | Bunner et al. |
| 2013/0037162 | A1 | * | 2/2013 | Shinohara ............ B23K 9/0253 138/171 |
| 2013/0174949 | A1 | * | 7/2013 | Hatano ................... C21D 6/004 148/609 |
| 2013/0252022 | A1 | | 9/2013 | Bullard |
| 2013/0292362 | A1 | | 11/2013 | Fairchild et al. |
| 2014/0346216 | A1 | * | 11/2014 | Rigal .................... B23K 20/021 228/194 |
| 2015/0084333 | A1 | * | 3/2015 | Prigent .................... B23K 9/02 285/288.1 |
| 2015/0129559 | A1 | | 5/2015 | Fairchild et al. |
| 2015/0299833 | A1 | | 10/2015 | Mizutani |
| 2015/0360317 | A1 | * | 12/2015 | Kalvala ............... B23K 20/1265 228/2.3 |
| 2015/0361664 | A1 | * | 12/2015 | Ichikawa ............... C22C 38/001 52/831 |
| 2016/0114423 | A1 | * | 4/2016 | Sugama ................. B23K 20/02 228/193 |

FOREIGN PATENT DOCUMENTS

| | | | | |
|---|---|---|---|---|
| GB | 2 250 941 | A | | 6/1992 |
| JP | 59087988 | A | * | 5/1984 ........... B23K 20/227 |
| JP | 62-199277 | A | | 9/1987 |
| JP | 364233 | B2 | | 10/1991 |
| JP | 4-200876 | | | 7/1992 |
| JP | 5-245658 | A | | 9/1993 |
| JP | 6-269959 | A | | 9/1994 |
| JP | 7-16792 | B2 | | 3/1995 |
| JP | 2510783 | B2 | | 4/1996 |
| JP | 2568313 | B2 | | 1/1997 |
| JP | 2916619 | | | 7/1999 |
| JP | 2011-200930 | A | | 10/2011 |
| JP | 2013-072113 | | | 4/2013 |
| JP | 2013-103271 | A | | 5/2013 |
| KR | 10-2010-0067513 | A | | 6/2010 |
| WO | WO 2013/092413 | A1 | | 6/2013 |
| WO | WO 2013092413 | A1 | | 6/2013 |
| WO | WO 2014184890 | A1 | | 11/2014 |

OTHER PUBLICATIONS

Written Opinion dated Nov. 11, 2014 in PCT/JP2014/074972 filed Sep. 19, 2014.
U.S. Office Action dated Aug. 15, 2017 in co-pending U.S. Appl. No. 14/881,971.
Notice of Final Rejection dated Sep. 26, 2017 in Korean Patent Application No. 10-2015-7030591 (with English language translation).
Office Action dated Feb. 27, 2017 in Korean Patent Application No. 10-2015-7030591 (with English translation).
Korean Office Action dated Nov. 24, 2017 in Korean Patent Application No. 10-2015-7030591 (with English translation).
Examination Report dated Nov. 23, 2017 in German Patent Application No. 11 2014 001 895.3 (with English language translation) citing document AO therein, 11 pages.
Office Action dated Apr. 5, 2017 in co-pending U.S. Appl. No. 14/881,971.
Office Action dated Nov. 14, 2016 in co-pending U.S. Appl. No. 14/881,971.

(56) References Cited

OTHER PUBLICATIONS

Office Action dated Jan. 18, 2018 in co-pending U.S. Appl. No. 14/881,971, citing documents AA-AB and AO-AP therein, 19 pages.
Office Action dated Mar. 30, 2018 in co-pending U.S. Appl. No. 15/471,712.
Office Action dated Mar. 29, 2018 in co-pending U.S. Appl. No. 15/471,635.
Office Action dated Aug. 13, 2018 in U.S. Appl. No. 15/471,635.
Office Action dated Mar. 7, 2018 in corresponding Korean Patent Application No. 10-2017-7037014 (with English Translation), citing document AO therein, 13 pages.
Office Action dated Sep. 13, 2018 in corresponding Korean Patent Application No. 10-2017-7037014 (with English Translation), citing document AO therein, 8 pages.
Office Action dated Jan. 17, 2019 in U.S. Appl. No. 15/471,635.
Office Action dated Jun. 3, 2019 in co-pending U.S. Appl. No. 15/471,635.

* cited by examiner

METHOD FOR BONDING STAINLESS STEEL MEMBERS AND STAINLESS STEEL

CROSS-REFERENCE TO RELATED APPLICATION(S)

This application is a divisional of U.S. application Ser. No. 14/881,971 filed Oct. 13, 2015, the entire contents of which is incorporated herein by reference. U.S. application Ser. No. 14/881,971 is a continuation application of International Application PCT/JP2014/074972 filed on Sep. 19, 2014 and designated the U.S., the entire contents of which are incorporated herein by reference.

FIELD

The present application relates to a method for bonding stainless steel members and a stainless steel.

BACKGROUND

A technology for bonding stainless steel members is being demanded. For example, Patent Document 1 discloses a technology in which surfaces of metal members are activated by removing oxides on bonding faces with a chemical treatment and thereby a diffusion bonding is performed at a low temperature for suppressing grain coarsening.

PRIOR ART DOCUMENT

Patent Document

Patent Document 1: Japanese Laid-open Patent Publication No. 2011-200930

SUMMARY

According to an aspect of the present invention, there is provided a method for bonding stainless steel members including: contacting a first stainless steel member with a second stainless steel member that has a strain exceeding 50% reduction; and heating the first and second stainless steel members to a re-crystallization initiation temperature or higher, after the contacting.

According to another aspect of the present invention, there is provided a stainless steel that is obtained by bonding the first stainless steel member and the second stainless steel member by the above-mentioned method for bonding stainless steel members.

According to another aspect of the present invention, there is provided a method for bonding stainless steel members including: contacting a first austenitic stainless steel member with a second austenitic stainless steel member that contains at least 30 volume % of martensite; and heating the first and second austenitic stainless steel members to an As temperature or higher, after the contacting.

According to another aspect of the present invention, there is provided a stainless steel that is obtained by bonding the first austenitic stainless steel member and the second austenitic stainless steel member by the above-mentioned method for bonding stainless steel members.

DESCRIPTION OF EMBODIMENTS

Generally, a stainless steel is made by a smelting or a refining. After that, a microstructure of the stainless steel is adjusted in order to provide superior performance and is shipped. Generally, the stainless steel is processed into assemblies, and the assemblies are assembled. Thereby, various apparatuses are manufactured. There are various bonding technologies for assembling a stainless steel. However, a solid-phase diffusion bonding for contacting a bonding face with another bonding face in a solid phase and heating the bonding faces has to be used as a bonding technology of small stainless steels that can be used and has strength at a relative low temperature and has a length of a few millimeters or less.

Figure 1:
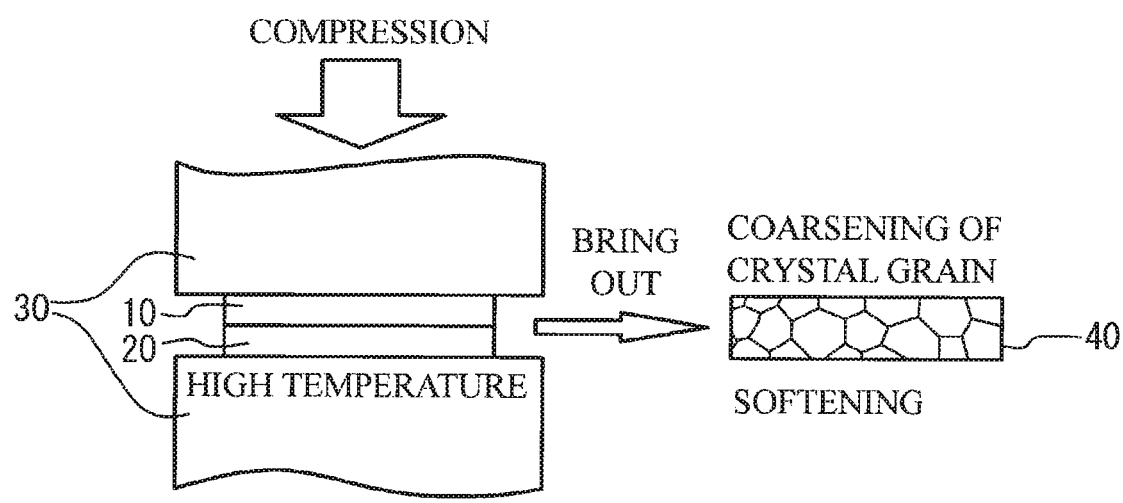
FIG. 1 illustrates a solid-phase diffusion bonding method in accordance with a comparative embodiment.

FIG. 1 illustrates a solid-phase diffusion bonding method in accordance with a comparative embodiment. As illustrated in FIG. 1, a stainless steel member 10 and a stainless steel member 20 are compressed to each other by a pressure device 30 at a high temperature. Thus, a stainless steel 40 that is a bonded assembly is obtained. In order to activate diffusion of constituent atoms sufficiently, a temperature of 1000 degrees C. or higher is needed. However, with a high temperature process, a problem may occur that coarsening of crystal grains occurs in the stainless steel 40, and a problem may occur that strength of the stainless steel 40 is reduced by softening.

In order to solve the problems, it is necessary to achieve the diffusion bonding even if the temperature is low. For the purpose of solving the problems, research and development are being performed in order to activate bonding faces by cleaning the bonding faces The above-mentioned Patent Document 1 is an example. However, in a process using activation of a surface, when an activated surface is exposed to air, the activated surface is instantly contaminated by oxygen. And, the activated surface may be inactivated. Therefore, high quality bonding may not be achieved. It is thought that a sequence of processes from the surface treatment to the bonding are performed in a vacuum chamber. However, in this case, cost may increase.

The present inventors focus attention on a phenomenon of re-crystallization occurring in a final thermal process of processes for adjusting a structure of a stainless steel member. During the phenomenon, in a material, a newly generated crystal grain (re-crystallized grain) grows up introducing atoms into a surface from a surrounding material. The driving force is caused by a difference of internal energy between re-crystallized grains that have low internal energy and are stable under an equilibrium state and re-crystallized grains that have high internal energy caused by strain or the like and are unstable. Based on the principle, when members are unstable by enhancing internal energy of the members, atoms near a metal surface become more stable by crossing a bonding face and moving to a surface of re-crystallized grains exposed from the other bonding face. Moreover, when the bonding faces disappear, energy becomes lower and brings stability. As a result, the re-crystallized grains of the other bonding face cross the other bonding face and grow up. Thereby, an integrated strong bonding is achieved. In this case, when the difference of the internal energy of the both is sufficiently large, the growing of the crystal grains progresses free from prevention by some contamination of the bonding faces.

First Embodiment

Figure 2:
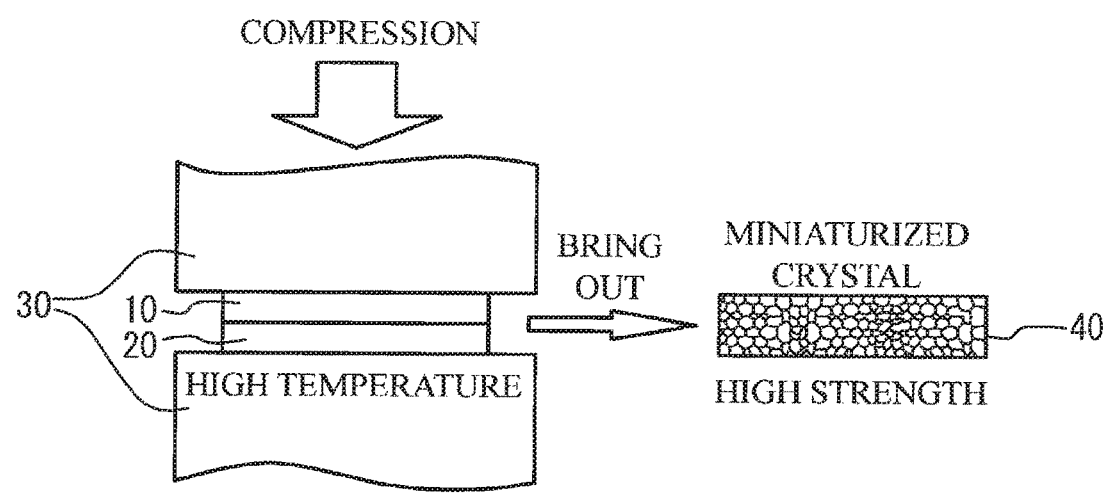
FIG. 2 illustrates a bonding method in accordance with a first embodiment.
Figure 3:
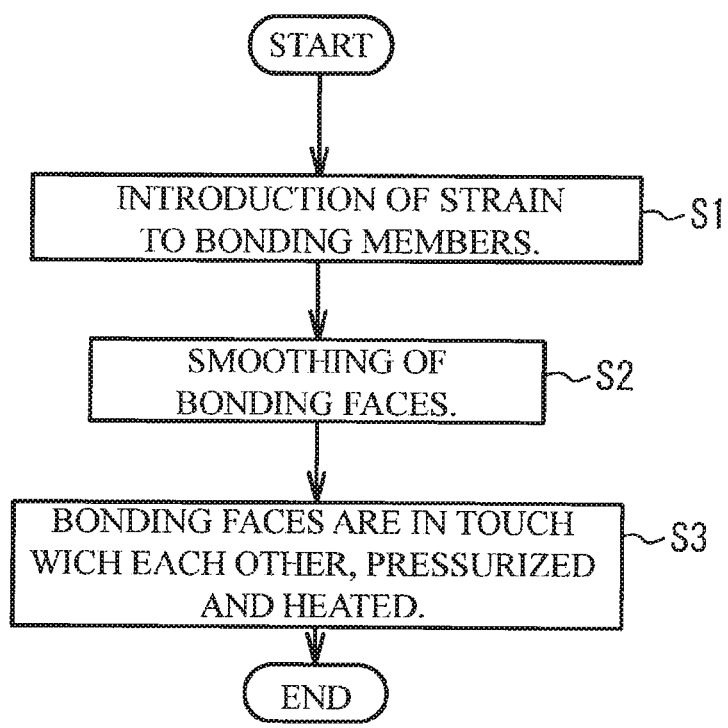
FIG. 3 illustrates a flowchart of a bonding method in accordance with a first embodiment.

FIG. 2 illustrates a bonding method in accordance with a first embodiment. FIG. 3 illustrates a flowchart of the bonding method. First, before heating for the bonding, at least one of the stainless steel member 10 and the stainless steel member 20 is subjected to a reduction exceeding 50% to accumulate strain thereinside (Step S1). Next, bonding surfaces of the stainless steel member 10 and the stainless steel member 20 are smoothed (Step S2).

Next, the bonding surfaces of the stainless steel member 10 and the stainless steel member 20 are in touch with each other and are heated (Step S3). A heating temperature in this case is equal to a re-crystallization initiation temperature or higher. When the temperatures of the stainless steel member 10 and the stainless steel member 20 are equal to the re-crystallization initiation temperature or higher, re-crystallized grains are generated in the stainless steel member 10 and the stainless steel member 20. Moreover, re-crystallized grains of the bonding face cross the bonding face and grow up, and strong bonding is achieved. Thus, the stainless steel 40 is obtained. When the stainless steel member 10 and the stainless steel member 20 are pressed by the pressure device 30 and tightly adhere to each other in Step S3, stronger bonding is achieved.

In the embodiment, the strain is accumulated in at least one of the stainless steel member 10 and the stainless steel member 20 by adding reduction exceeding 50%. Thus, it is possible to achieve high quality bonding at a relative low temperature that is equal to the re-crystallization initiation temperature or higher. The crystal of the stainless steel 40 is miniaturized, because the bonding at the relative low temperature is achieved. Therefore, it is possible to suppress softening of the stainless steel 40. Accordingly, it is possible to manufacture a bonded assembly having high material strength and high spring characteristics. Even if the bonding surface is contaminated to some extent because of adsorption of oxygen or the like, the bonding can be achieved. It is therefore possible to perform the sequence of processes in normal air except for the heating for the bonding. Moreover, it is possible to adjust the structure of the stainless steel 40 to a necessary fine structure by a combination of a processing of enhancing internal energy in advance and adding strain, the bonding temperature and the process time. It is therefore possible to perform a manufacturing of materials and assembling of assemblies in parallel in the sequence of processes. And, it is possible to contribute to efficiency of works and energy conservation, by omitting a thermal process to adjust a fine structure during a material manufacturing.

With the bonding method in accordance with the embodiment, the bonding of high quality can be achieved at a temperature that is equal to the re-crystallization initiation temperature or higher. However, it is preferable that the bonding is achieved at a temperature that is equal to the re-crystallization initiation temperature or higher and is equal to the re-crystallization initiation temperature plus 100 degrees C. or lower, from a viewpoint of suppression of coarsening of the crystal grains. And, it is preferable that both of the stainless steel member 10 and the stainless steel member 20 are subjected to the reduction exceeding 50% and the strain is accumulated in both of the stainless steel member 10 and the stainless steel member 20.

Second Embodiment

Figure 4:
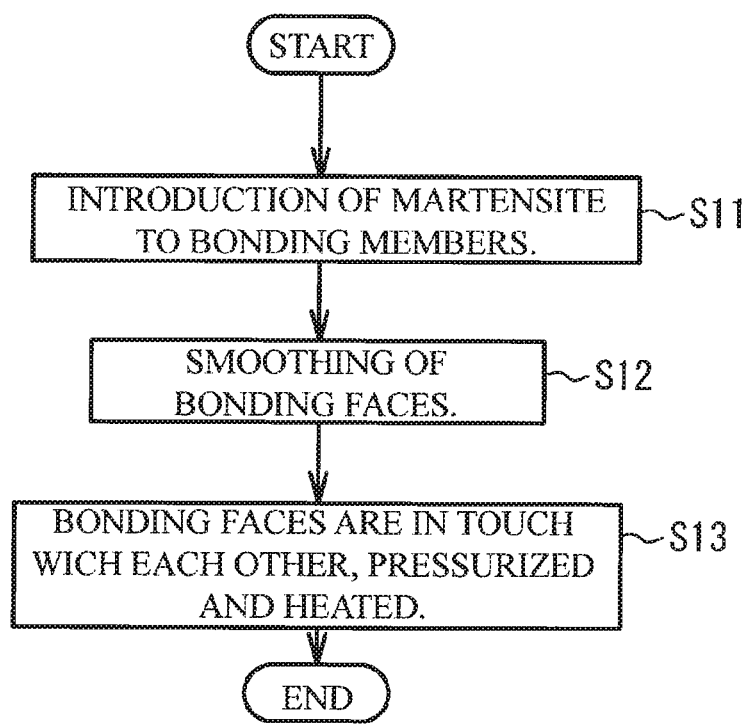
FIG. 4 illustrates a flowchart of a bonding method in accordance with a second embodiment.

In a second embodiment, an effect caused by a phase transformation of metastable austenite-based stainless steel is used. FIG. 4 illustrates a flowchart of a bonding method in accordance with the second embodiment. In the embodiment, the metastable austenite-based stainless steel is used as the stainless steel members 10 and 20. In the embodiment, the device that is the same as the first embodiment can be used.

Before the heating for the bonding, strain is added to at least one of the stainless steel member 10 and the stainless steel member 20 at a temperature that is equal to an Md point or lower. Thereby, martensite of 30 volume % or more is generated in the stainless steel member to which the strain is added (Step S11). Martensite transformation is achieved by processing at the Md point or lower.

Next, the bonding surfaces of the stainless steel members 10 and 20 are smoothed (Step S12). Next, the bonding surfaces of the stainless steel members 10 and 20 are in touch with each other and are heated (Step S13). The temperature of this case is equal to an As point of the stainless steel members 10 and 20 or higher. The martensite is transformed into austenite when the martensite is heated to the As point or higher. When the temperatures of the stainless steel members 10 and 20 are equal to the As point or higher, re-crystallized grains are generated inside the stainless steel members 10 and 20. Moreover, at a bonding face, the re-crystallized grains cross the bonding face and grow up. And, a strong bonding is achieved. Thus, the stainless steel 40 is obtained. When the stainless steel members 10 and 20 are compressed to each other by the pressure device 30 and adhere to each other, stronger bonding is achieved.

In the embodiment, at least one of the metastable austenite-based stainless steel members 10 and 20 contains at least 30 volume % of martensite. Thereby, high quality bonding can be achieved at a relative low temperature that is equal to the As point or higher. By achieving the bonding at a low temperature, the structure of the stainless steel 40 is miniaturized and softening of the stainless steel 40 is suppressed. It is therefore possible to manufacture a bonded assembly that has high material strength and high spring characteristic. Even if bonding faces are contaminated in some degree because of adsorption of oxygen, bonding can be achieved. It is therefore possible to perform a sequence of processes in normal air, except for the heating for the bonding. Moreover, it is possible to adjust the structure into a necessary fine structure by combining of a process of generating the martensite, the bonding temperature and the process time. It is therefore possible to perform a manufacturing of materials and assembling of assemblies in parallel in the sequence of processes. And it is possible to contribute to efficiency of works and energy saving by omitting a thermal process for adjusting of a microstructure in a manufacturing of materials.

In the bonding method in accordance with the embodiment, high quality bonding can be achieved at a temperature that is equal to the As point or higher. However, it is preferable to achieve the bonding at a temperature that is equal to the As point or higher and is equal to a re-crystallization initiation temperature plus 100 degrees C. or lower, in terms of suppressing coarsening crystal grains. It is preferable that at least one of the stainless steel members 10 and 20 contains at least 50 volume % of martensite. It is more preferable that at least one of the stainless steel members 10 and 20 contains at least 80 volume % of martensite. Both of the stainless steel members 10 and 20 may contain at least 30 volume % of martensite. In this case, it is preferable that both of the stainless steel members 10 and 20 contain at least 50 volume % of martensite. It is more preferable that both of the stainless steel members 10 and 20 may contain at least 80 volume % of martensite.

In the embodiment, the martensite is generated by the process at the Md point or lower. However, the martensite may be generated by rapidly cooling stable austenite to the Ms point or lower. When stable austenite is rapidly cooled to the Ms point or lower, the martensite is generated.

EXAMPLES

First Example

Austenite-based stainless steel SUS316L was subjected to 99% reduction at a normal temperature (that is equal to the Md point or higher) by forging and rolling. The resulting board having a thickness of 1 mm was cut into two small pieces having a width of 12 mm and a length of 20 mm. First faces of the small pieces were processed into mirrored faces by emery paper and buffing in the atmosphere. The mirrored faces are made to face with each other and arranged crosswise in a vacuum chamber. Thus, the faces of 12 mm×12 mm adhered to each other. After vacuuming, the pieces were heated by high frequency heating to 730 degrees C. that is equal to a re-crystallization initiation temperature or higher under a condition that a load of 1 kN was added to the pieces in order to achieve adherence of the pieces. After the temperature of 730 degrees C. under the condition was kept for 30 minutes, the pieces were unloaded, cooled and brought out. Thereby, the pieces were strongly bonded. For confirmation, one of the pieces bonded crosswise was fixed by a vise, and the other was hammered to a dragging away direction. This results in bending of the piece fixed by the vise without dragging away.

Second Example

In a second example, the same bonding as the first example except for adding 80% rolling was performed. In the second example, a strong bonding was achieved.

First Comparative Example

In a first comparative example, the same bonding as the first example except for adding 50% rolling was performed. The resulting bonded assembly was dragged away by hammering.

Second Comparative Example

In a second comparative example, the same bonding as the first example was performed except for using SUS316L material in which strain was completely removed and was subjected to a solution treatment. The resulting bonded assembly was easily dragged away by a hand.

(First Analysis)

In the first and second examples, it is thought that re-crystallized grains crossed a bonding face and grew up and high quality bonding was achieved because strain was accumulated in the pieces by adding reduction exceeding 50% and, after that, the bonding was performed at a temperature that is equal to the re-crystallization initiation temperature or higher. On the other hand, in the second comparative example, it is thought that strong bonding was not achieved because the strain was completely removed. In the first comparative example, it is thought that sufficient bonding strength was not achieved because of lack of strain although given bonding strength was achieved by accumulation of internal strain.

Third Example

In a third example, metastable austenite-based stainless steel SUS304 was subjected to totally 99% strain at 300 degrees C. (that is equal to the Md point or higher) by multi-direction forging and rolling corresponding to 90% and rolling corresponding to 90%. The resulting board having a thickness of 1 mm was cut into two small pieces having a width of 12 mm and a length of 20 mm. First faces of the small pieces were processed into mirrored faces by emery paper and buffing in the atmosphere. The mirrored faces are made to face with each other and arranged crosswise in a vacuum chamber. Thus, the faces of 12 mm×12 mm adhered to each other. After vacuuming, the pieces were heated by high frequency heating to 730 degrees C. that is equal to a re-crystallization initiation temperature or higher under a condition that a load of 1 kN was added to the pieces in order to achieve adherence of the pieces. After the temperature of 730 degrees C. under the condition was kept for 30 minutes, the pieces were unloaded, cooled and brought out. Thereby, the SUS304 pieces were strongly bonded although, normally, a temperature of approximately 1000 degrees C. was needed for diffusion bonding of SUS304 pieces.

Figure 5:
FIG. 5 illustrates a result of a cross section around a bonding part observed by EBSD.

Cross sections near the bonding part were observed by EBSD (Electron Backscatter Diffraction). FIG. 5 illustrates the observation result. In FIG. 5, the bonding part is between a left arrow and a right arrow. Although the cross sections were smoothed before bonding, unevenness caused by grain growth from up and down was observed.

Fourth Example

In a fourth example, austenite-based stainless steel SUS316L was subjected to 99% reduction at a normal temperature (that is equal to the Md point or higher) by forging and rolling. The resulting board having a thickness of 1 mm was cut into two small pieces having a width of 10 mm and a length of 50 mm. First faces of the small pieces were processed into mirrored faces by emery paper and buffing in the atmosphere. The mirrored faces are made to face with each other and arranged crosswise in a vacuum chamber. Thus, the faces of 10 mm×10 mm adhered to each other. After vacuuming, the pieces were heated by high frequency heating to various temperatures under a condition that a load of 1 kN was added to the pieces through a punched hole having a diameter of 5 mm in order to achieve adherence of the pieces. After the temperatures under the condition was kept for 30 minutes, the pieces were unloaded, cooled and brought out. For confirmation, a cross tension test of 0.01 mm/s was performed. And bonding strength was evaluated.

Third Comparative Example

In a third comparative example, the same bonding as the fourth example was performed except for using SUS316L material in which strain was completely removed and was subjected to a solution treatment.

(Second Analysis)

Figure 6:
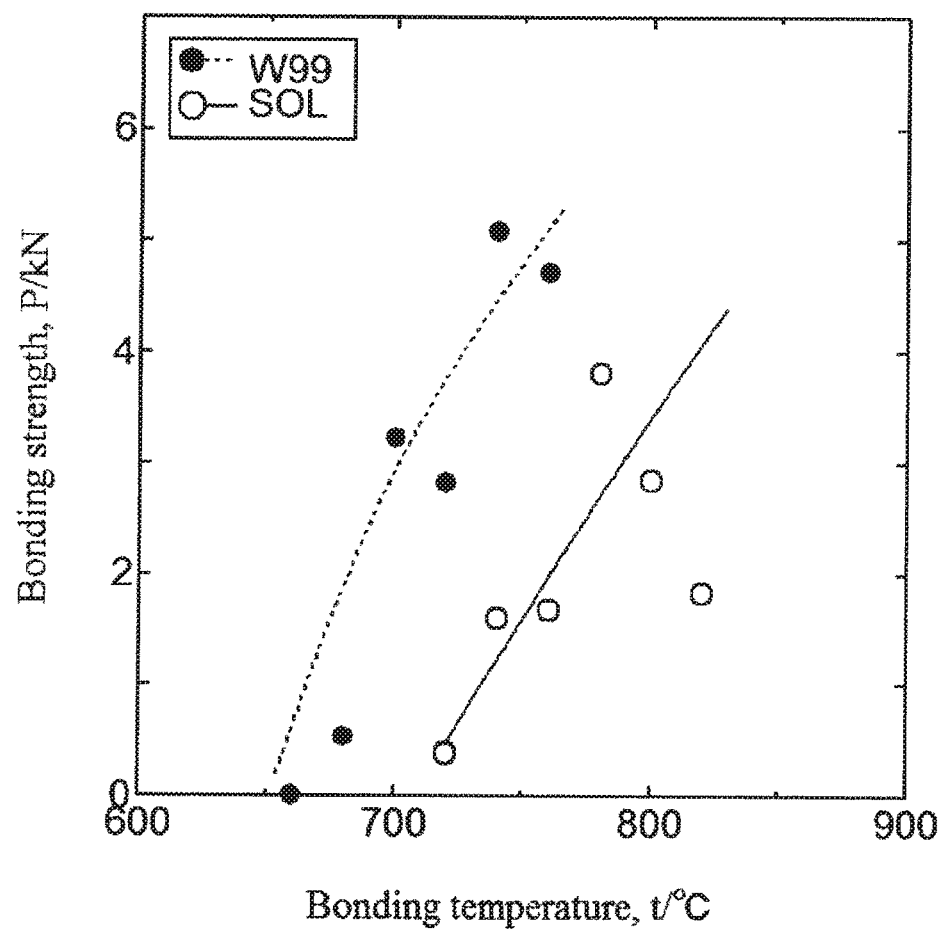
FIG. 6 illustrates a relationship between temperatures during bonding and bonding strength.

FIG. 6 illustrates a relationship between the temperatures during the bonding of the fourth example and the third comparative example and the bonding strength. In FIG. 6, a horizontal axis indicates the temperatures during the bonding. A vertical axis indicates the bonding strength. W99 indicates the results of the fourth example. SOL indicates the results of the third comparative example. As illustrated in FIG. 6, in the both cases, the bonding strength tends to increase as the temperature during the bonding increases. However, the results of the fourth example are shifted to a lower temperature side, compared to the third comparative example. That is, it is apparent that in the fourth example, the temperature during the bonding can be reduced in order to achieve identical bonding strength, compared to the third comparative example.

Fifth Example

In a fifth example, metastable austenite-based stainless steel SUS304 was subjected to 90% reduction at 300 degrees C. (that is equal to the Md point or higher) by multi-direction forging and rolling and was subjected to 90% rolling at a normal temperature (that is equal to the Md point or lower). Almost entirely the resulting board was transformed into martensite and had a thickness of 1 mm. The resulting board was cut into two small pieces having a width of 12 mm and a length of 20 mm. First faces of the small pieces were processed into mirrored faces by emery paper and buffing in the atmosphere. The mirrored faces are made to face with each other and arranged crosswise in a vacuum chamber. Thus, the faces of 12 mm×12 mm adhered to each other. After vacuuming, the pieces were heated by high frequency heating to 700 degrees C. that is equal to the As point or higher under a condition that a load of 1 kN was added to the pieces in order to achieve adherence of the pieces. After the temperature of 700 degrees C. under the condition was kept for 30 minutes, the pieces were unloaded, cooled and brought out. Thereby, the SUS304 pieces were strongly bonded although, normally, a temperature of approximately 1000 degrees C. was needed for diffusion bonding of SUS304 pieces. For confirmation, one of the pieces bonded crosswise was fixed by a vise, and the other was hammered to a dragging away direction. This results in bending of the piece fixed by the vise without dragging away.

Fourth Comparative Example

In a fourth comparative example, the bonding test was performed under the same condition as the fifth example with use of a SUS304 sample that was subjected to totally 99% strain by multi-direction forging and rolling corresponding to 90% and rolling corresponding to 90% at 300 degrees C. The rolling was not performed at a temperature that is equal to the Md point or lower. Therefore, martensite was not generated. When one of the members bonded crosswise was fixed by a vise and the other of the members was hammered in a dragging away direction, the other was dragged away.

Fifth Comparative Example

In a fifth comparative example, the test was performed under the same condition as the fourth comparative example except for using the same size SUS304 to which strain was not added after the a thermal process for removing the strain.

(Third Analysis)

In the fifth example, it is thought that re-crystallized grains crossed a bonding face and grew up and high quality bonding was achieved because the martensite of 30 volume % or more was generated and the bonding was performed at the temperature that is equal to the As point or higher. On the other hand, in the fourth and fifth comparative examples, it is thought that strong bonding was not achieved because the martensite was not generated. In the fourth comparative example, it is thought that strong bonding was not achieved, because the temperature was not increased to the re-crystallization temperature or higher although the strains was added.

Sixth Example

In a sixth example, metastable austenite-based stainless steel SUS304 was subjected to 90% reduction at 300 degrees C. (that is equal to the Md point or higher) by multi-direction forging and rolling and was subjected to rolling corresponding to 90% at a normal temperature (that is equal to the Md point or lower). Almost entirely the resulting board was transformed into martensite and had a thickness of 1 mm. The resulting board was cut into two small pieces having a width of 10 mm and a length of 50 mm. First faces of the small pieces were processed into mirrored faces by emery paper and buffing in the atmosphere. The mirrored faces are made to face with each other and arranged crosswise in a vacuum chamber. Thus, the faces of 10 mm×10 mm adhered to each other. After vacuuming, the pieces were heated by high frequency heating to various temperatures under a condition that a load of 1 kN was added to the pieces through a punched hole having a diameter of 5 mm in order to achieve adherence of the pieces. After the temperatures under the condition was kept for 30 minutes, the pieces were unloaded, cooled and brought out. For confirmation, a cross tension test of 0.01 mm/s was performed. And bonding strength was evaluated.

Seventh Example

In a seventh example, the same bonding as the sixth example was performed except for using SUS304 material in which strain was completely removed and was subjected to a solution treatment, as one of the two small pieces.

Sixth Comparative Example

In a sixth comparative example, the same bonding as the seventh example was performed except for using SUS304 material in which strain was completely removed and was subjected to a solution treatment, as the two small pieces.

(Fourth Analysis)

Figure 7:
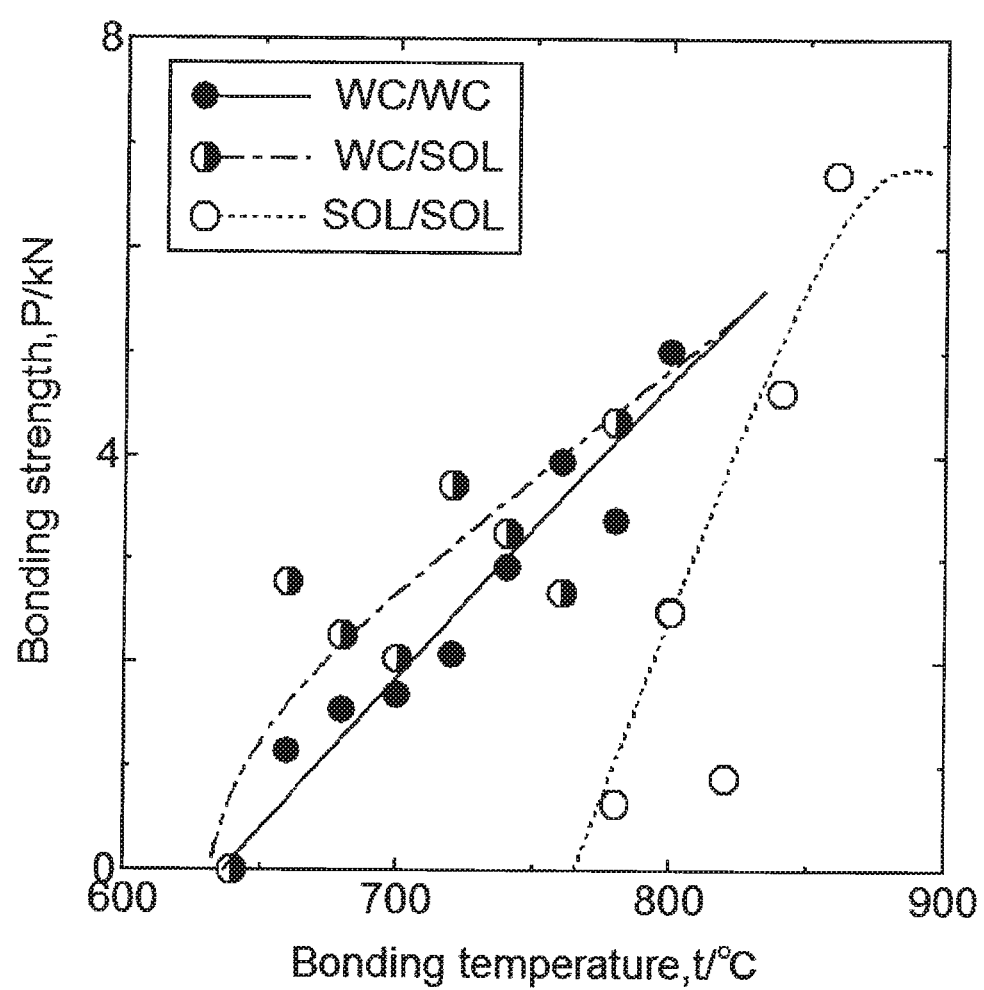
FIG. 7 illustrates a relationship between temperatures during bonding and bonding strength.

FIG. 7 illustrates a relationship between the temperatures during the bonding of the sixth and seventh examples and the sixth comparative example and the bonding strength. In FIG. 7, a horizontal axis indicates the temperatures during the bonding. A vertical axis indicates the bonding strength. WC/WC indicates the results of the sixth example. WC/SOL indicates the results of the seventh example. SOL/SOL indicates the results of the sixth comparative example. As illustrated in FIG. 7, in any cases, the bonding strength tends to increase as the temperature during the bonding increases. However, the results of the sixth and seventh examples are shifted to a lower temperature side, compared to the sixth comparative example. That is, it is apparent that in the sixth and seventh examples, the temperature during the bonding can be reduced in order to achieve identical bonding strength, compared to the sixth comparative example.

Eighth Example

In an eighth example, austenite-based stainless steel SUS304 was subjected to 99% reduction at 300 degrees C. (that is equal to the Md point or higher) by forging and rolling. The resulting board having a thickness of 1 mm was cut into two small pieces having a width of 10 mm and a length of 50 mm. First faces of the small pieces were processed into mirrored faces by emery paper and buffing in the atmosphere. The mirrored faces are made to face with each other and arranged crosswise in a vacuum chamber. Thus, the faces of 10 mm×10 mm adhered to each other. After vacuuming, the pieces were heated by high frequency heating to various temperatures under a condition that a load of 1 kN was added to the pieces through a punched hole having a diameter of 5 mm in order to achieve adherence of the pieces. After the temperatures under the condition were kept for 30 minutes, the pieces were unloaded, cooled and brought out. For confirmation, a cross tension test of 0.01 mm/s was performed. And bonding strength was evaluated.

Ninth Example

In a ninth example, the same bonding as the eighth example was performed except for rolling of 80%.

(Fifth Analysis)

Figure 8:
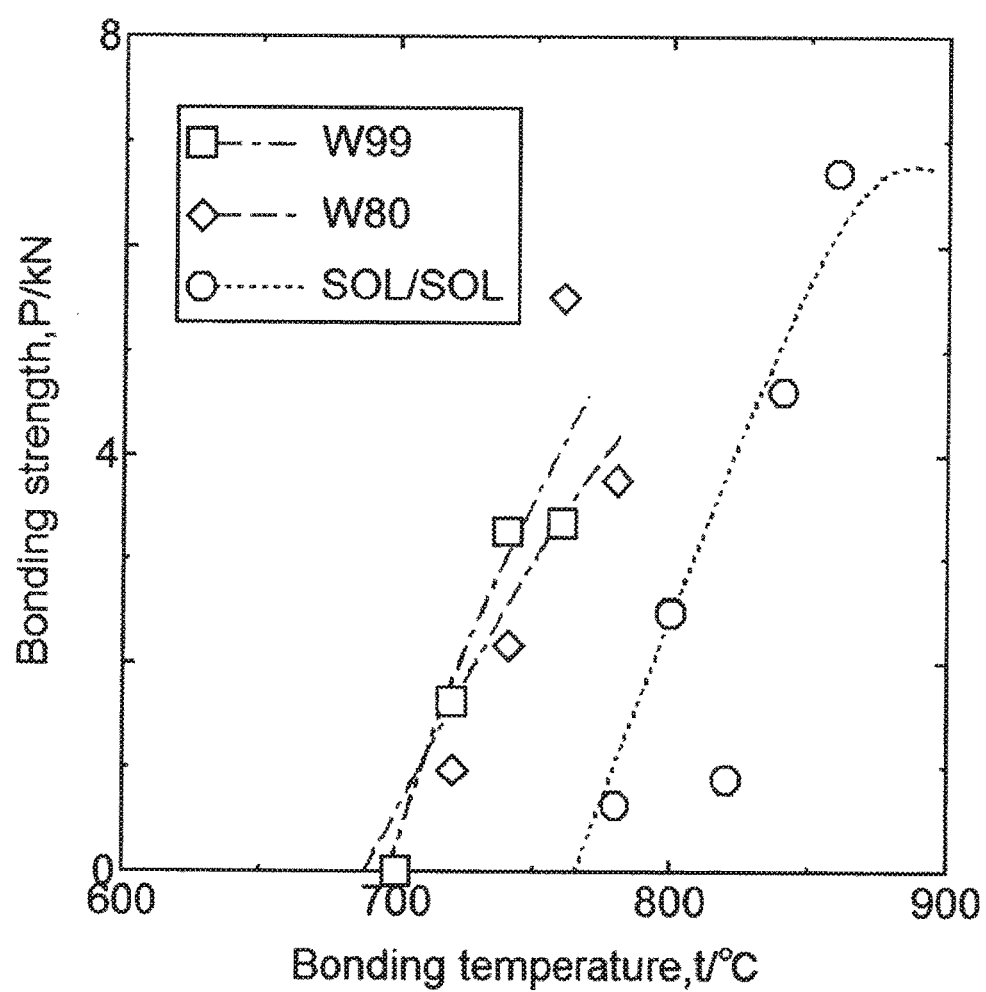
FIG. 8 illustrates a relationship between temperatures during bonding and bonding strength.

FIG. 8 illustrates a relationship between the temperatures during the bonding of the eighth example, the ninth example and the sixth comparative example and the bonding strength. In FIG. 8, a horizontal axis indicates the temperatures during the bonding. A vertical axis indicates the bonding strength. W99 indicates the results of the eighth example. W80 indicates the results of the ninth example. SOL/SOL indicates the results of the sixth comparative example. As illustrated in FIG. 6, in any cases, the bonding strength tends to increase as the temperature during the bonding increases. However, the results of the eighth and ninth examples are shifted to a lower temperature side, compared to the sixth comparative example. That is, it is apparent that in the eighth and ninth examples, the temperature during the bonding can be reduced in order to achieve identical bonding strength, compared to the sixth comparative example.

The present invention is not limited to the specifically described embodiments, but other embodiments and variations may be made without departing from the scope of the claimed invention.

What is claimed is:

1. A method for bonding stainless steel members comprising:
    transforming a second austenitic stainless steel member substantially into martensite by performing rolling with respect to the second austenitic stainless steel member at a temperature that is equal to an Md point or lower, the Md point being a temperature at which martensite transformation is achieved by processing;
    contacting a first austenitic stainless steel member with the second austenitic stainless steel member; and
    diffusion bonding by heating the first and second austenitic stainless steel members to an As temperature or higher, after the contacting,
    wherein in the heating, the first austenitic stainless steel member and the second austenitic stainless steel member are heated to a temperature that is equal to the As temperature or higher and is equal to a re-crystallization initiation temperature plus 100 degrees C. or lower.

2. The method for bonding stainless steel members as claimed in claim 1, wherein the first austenitic stainless steel member contains at least 30 volume % of martensite.

3. A method for bonding stainless steel members comprising:
    transforming a second austenitic stainless steel member substantially into martensite by performing rolling with respect to the second austenitic stainless steel member at a temperature that is equal to an Md point or lower, the Md point being a temperature at which martensite transformation is achieved by processing;
    contacting a first austenitic stainless steel member that contains at least 30 volume % of martensite with the second austenitic stainless steel member; and
    diffusion bonding by heating the first and second austenitic stainless steel members to an As temperature or higher, after the contacting.

4. The method for bonding stainless steel members as claimed in claim 1, wherein the first austenitic stainless steel member and the second austenitic stainless steel member are in a solid-phase during contacting.

* * * * *